(12) United States Patent
Fraser et al.

(10) Patent No.: US 6,769,454 B2
(45) Date of Patent: Aug. 3, 2004

(54) FLEXIBLE PIPE INCLUDING A VENT PASSAGE AND METHOD OF MANUFACTURING SAME

(75) Inventors: Dana J. Fraser, Panama City, FL (US); Mark D. Kalman, Katy, TX (US)

(73) Assignee: Wellstream International Limited (GB)

( * ) Notice: Subject to any disclaimer, the term of this patent is extended or adjusted under 35 U.S.C. 154(b) by 0 days.

(21) Appl. No.: 10/229,510

(22) Filed: Aug. 28, 2002

(65) Prior Publication Data

US 2003/0056845 A1 Mar. 27, 2003

Related U.S. Application Data

(63) Continuation-in-part of application No. 09/705,309, filed on Nov. 3, 2000, now Pat. No. 6,446,672.
(60) Provisional application No. 60/163,908, filed on Nov. 5, 1999.

(51) Int. Cl.$^7$ .................................................. F16L 11/10
(52) U.S. Cl. .................... 138/127; 138/135; 138/130; 138/104; 138/144
(58) Field of Search ........................ 138/124, 125, 138/126, 127, 130, 135, 144, 104, 121

(56) References Cited

U.S. PATENT DOCUMENTS

| | | | |
|---|---|---|---|
| 3,441,057 A | | 4/1969 | Clement et al. |
| 3,512,581 A | * | 5/1970 | Lawton ....................... 138/105 |
| 3,585,540 A | | 6/1971 | Schuttloffel et al. |
| 3,791,898 A | * | 2/1974 | Remi .......................... 156/143 |
| 3,809,128 A | * | 5/1974 | Tateisi et al. ............... 138/114 |
| 3,860,040 A | | 1/1975 | Sullivan |
| 4,285,534 A | | 8/1981 | Katayama et al. |
| 4,402,346 A | | 9/1983 | Cheetham et al. |
| 4,492,089 A | | 1/1985 | Rohrer et al. |
| 4,552,166 A | * | 11/1985 | Chadbourne, Sr. et al. . 138/104 |
| 4,684,427 A | * | 8/1987 | Abernathy ................... 138/111 |
| 4,700,751 A | | 10/1987 | Fedrick |
| 4,756,339 A | | 7/1988 | Buluschek |
| 5,174,685 A | | 12/1992 | Buchanan |
| 5,275,209 A | | 1/1994 | Sugler et al. |
| 5,314,210 A | | 5/1994 | Calmettes et al. |
| 5,667,008 A | | 9/1997 | Moore |
| 5,676,175 A | | 10/1997 | Bar et al. |
| 5,782,506 A | | 7/1998 | Uematsu et al. |
| 5,890,960 A | | 4/1999 | Cronan et al. |
| 5,918,641 A | | 7/1999 | Hardy et al. |
| 5,921,285 A | | 7/1999 | Quigley et al. |
| 5,934,332 A | | 8/1999 | Rodriquez et al. |
| 6,004,639 A | | 12/1999 | Quigley et al. |
| 6,016,845 A | | 1/2000 | Quigley et al. |
| 6,016,848 A | | 1/2000 | Egres, Jr. |
| 6,032,699 A | * | 3/2000 | Cochran et al. ............. 138/104 |
| 6,039,083 A | * | 3/2000 | Loper ......................... 138/135 |
| 6,334,466 B1 | * | 1/2002 | Jani et al. ................... 138/141 |

OTHER PUBLICATIONS

International Searching Authority, Patent Cooperation Treaty, Notification of Transmittal of the International Search Report or the Declaration, International Application No. PCT/US00/30513, Apr. 2, 2001, 5 pages.

* cited by examiner

Primary Examiner—James Hook
(74) Attorney, Agent, or Firm—Haynes and Boone, LLP.

(57) ABSTRACT

A flexible pipe formed by multiple layers of different materials, and one or more vent passages are provided in one of the layers for venting any gases permeating through the pipe.

24 Claims, 1 Drawing Sheet

FLEXIBLE PIPE INCLUDING A VENT PASSAGE AND METHOD OF MANUFACTURING SAME

This application is a continuation-in-part of patent application Ser. No. 09/705,309 filed Nov. 3, 2000 now Pat. No. 6,446,672 which, in turn, claims priority of provisional application Ser. No. 60/163,908 filed Nov. 5, 1999.

This invention relates to a flexible pipe having multiple layers, one of which is formed with a vent passage for venting gases that permeate through the pipe.

DETAILED DESCRIPTION

Figure 1:
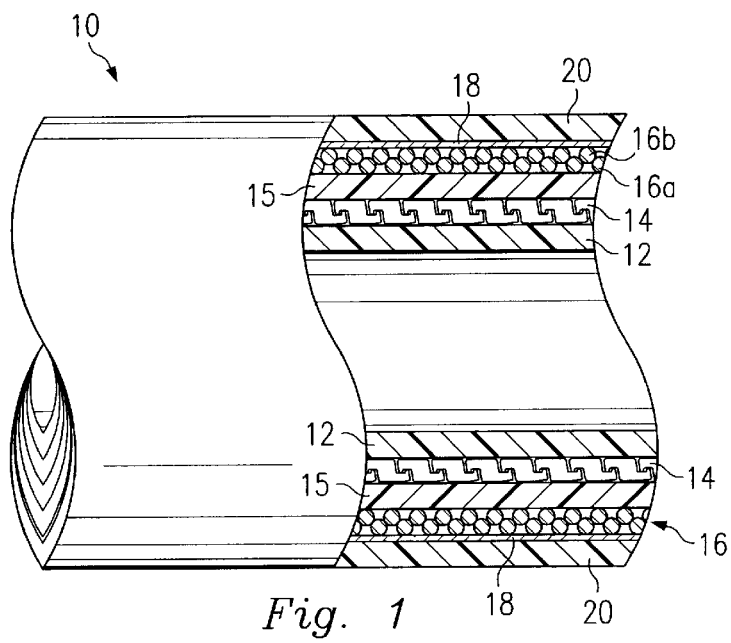
FIG. 1 is a longitudinal sectional view of a flexible pipe according to an embodiment of the present invention.
Figure 2:
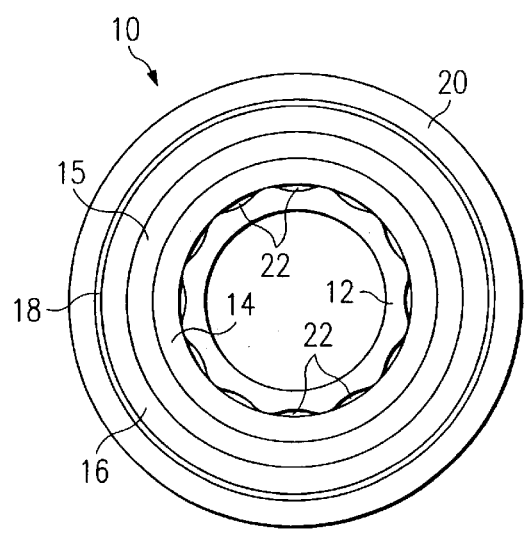
FIG. 2 is an end view of the pipe of FIG. 1.

With reference to FIG. 1, a flexible pipe according to an embodiment of the present invention is shown, in general by the reference numeral 10. The pipe 10 is formed by an inner layer 12, preferably in the form of an extruded plastic sheath, for conveying fluid through its bore. As shown in FIG. 2, the outer surface of the layer 12 is undulated thus forming a series of ridges and valleys for reasons to be described. The layer 12 may be formed in a conventional manner using polymers, or the like.

A layer 14 extends around the layer 12 and provides resistance to internal pressure, hydrostatic collapse and crush. The layer 14 is formed by helically wrapping a continuous metal strip, preferably formed of carbon steel, with adjacent windings being interlocked, to form a flexible layer that provides significant hoop and axial strength. The layer 14 is marketed by the assignee of the present invention, Wellstream, Inc., under the "Flexlok" trademark. Alternatively, the layer 14 can be of the types disclosed in application Ser. No. 09/706,070 filed concurrently herewith and assigned to the assignee of this application; with the disclosure of the former application being incorporated by reference.

A seal layer 15, preferably in the form of an extruded plastic sheath, is provided over the layer 14 to increase the resistance to hydrostatic compression, and assist in limiting the moisture that permeates from the bores of the layer 12.

A layer 16 of wrapped wires extends over the layer 15 and consists of a series of wires 16a helically wrapped around the exterior of the layer 15 to form a first tensile layer, and an additional series of wires 16b wrapped around the first series of wires 16a to form a second tensile layer extending over the first tensile layer. The wires 16a and 16b may have a circular cross section, and are wound at a relatively high lay angle to provide significant hoop strength and axial strength. Preferably, at least a portion of the wires 16a and 16b are formed by carbon steel with a plastic or anodic coating. It is noted that the layer 14 prevents the expansion of the layer 12 into gaps formed between the wires of the tensile layers 16a and 16b.

A layer 18 is formed by helically wrapping tape over the layer 16. The tape forming the layer 18 can be plastic or metal and can be reinforced with glass, metal or a different type of plastic. Although not shown in the drawings, it is understood that the tape layer 18 can also extend between the layer 14 and the layer 16, and between the series of wires 16a and 16b.

A protective outer layer 20 extends over the tape layer 18 and is preferably in the form of an extruded plastic sheath that extends over the tape layer in a conventional manner, with the tape providing a smooth surface for the extrusion. The layer 20 is optional and is required only when the tape layer is inadequate to protect the remaining components of the pipe 10.

In operation, when the pipe 10 is put into service the ridges formed by the undulating outer surface of the layer 12, and the corresponding inner surface of the layer 14, form passages 22 for venting any gases that might permeate through the layer 12. These passages extend for the length of the pipe 10 and can discharge into the ambient environment or atmosphere at one of the ends of the pipe.

Figure 3:
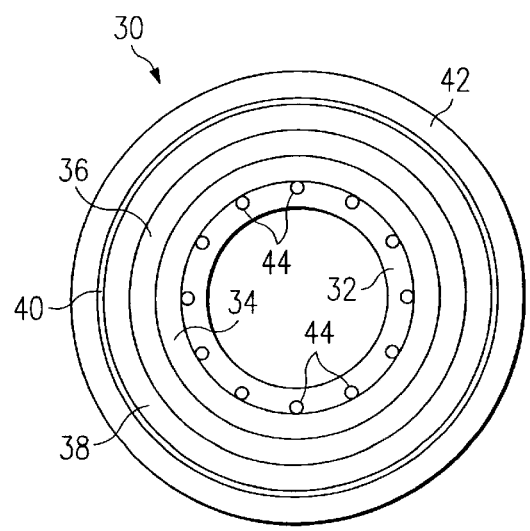
FIG. 3 is a view similar to FIG. 2 but depicting an alternate embodiment of the invention.

According to the embodiment of FIG. 3, a flexible pipe according to an embodiment of the present invention is shown, in general by the reference numeral 30. The pipe 30 is formed by an inner layer 32, preferably in the form of an extruded plastic tubular member, or sheath, for conveying fluid through its bore. The layer 32 may be formed in a conventional manner using polymers, or the like.

A metal strip layer 34 extends around the layer 32 and provides resistance to internal pressure, hydrostatic collapse and crush. Since the layer 34 is identical to the layer 14 of the embodiment of FIGS. 1 and 2, is will not be described in any further detail.

A seal layer 36, preferably in the form of an extruded plastic sheath, is provided over the layer 34 to increase the resistance to hydrostatic compression, and assist in limiting the moisture that permeates from the bores of the layer 32.

A layer 38 extends over the layer 36 and consists of a series of wrapped wires forming two tensile layers. Since the layer 38 is identical to the layer 16 of the embodiment of FIGS. 1 and 2, is will not be described in any further detail.

A layer 40 is formed by helically wrapping tape over the layer 38. The tape forming the layer 40 can be plastic or metal and can be reinforced with glass, metal or a different type of plastic. Although not shown in the drawing, it is understood that the tape layer 40 can also extend between the layers 32 and 34, between the layers 34 and 36, between the layers 36 and 38, between the layer 38 and 40, and/or between the layers of wrapped wires forming the layer 38.

A protective outer layer 42 extends over the tape layer 40 and is preferably in the form of an extruded plastic sheath that extends over the tape layer in a conventional manner, with the tape providing a smooth surface for the extrusion. The layer 42 is optional and is required only when the tape layer 40 is inadequate to protect the remaining components of the pipe 40.

According to the embodiment of FIG. 3, the undulations of the previous embodiment are eliminated and a plurality of relatively small-diameter tubes 44 are embedded in, and angularly spaced around, the layer 32. Although not shown in the drawings due to scale limitations, it is understood that the tubes 44 are provided with relatively small holes or slits, or are fabricated from a material having a relatively high porosity, such as a foam structure, to receive any gases that might permeate through the layer 32 or at least a portion of the layer. The tubes 44 extend for the length of the pipe and thus pass any of the latter gases to one or both ends of the pipe 30 for discharge into the ambient environment or atmosphere. Thus, the embodiment of FIG. 3 enjoys all of the advantages of that of FIGS. 1 and 2

VARIATIONS

1. Additional tensile layers of wires can be provided in addition to the series of wires 16a and 16b and the wires forming the layer 38.

2. Each layers 16a and 16b can be formed by one wire rather than by a series of wires, and only one layer (16a or 16b) can be provided.

3. The adjacent windings of the strip forming the layers 14 and 34 do not have to be interlocked.

4. In the embodiment of FIG. 3, the seal layer 36 can be placed between the seal layers 34 and 38 (as shown and described above), and/or between the layers 38 and 40, and/or between the layers 40 and 42.

5. The cross section of the wires 16a and 16b, and the wires forming the layer 38 can be round or rectangular as disclosed in the above cited application.

6. In extremely hostile environments, an outer layer similar to the layer 14 and 34 can be placed around the sheaths 20 and 42, respectively for added protection.

7. The layers 14 and 34 can be eliminated and the layers 16 and 36 can be applied directly over the tubular members, 12 and 32, respectively.

8. The layers 15 and 36 can be eliminated and the layers 16 and 38 can be applied directly over the layers 14, and 34, respectively.

It is understood that spatial references, such as "under", "over", "between", "outer", "inner" and "surrounding" are for the purpose of illustration only and do not limit the specific orientation or location of the layers described above.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A flexible pipe comprising an inner tubular layer defining an inner longitudinal passage; at least one longitudinally extending tube embedded in the inner layer and extending for the length of the inner layer; the tube adapted to receive any gases permeating through or into the inner layer and vent gases from the pipe; and an outer layer extending over the inner layer.

2. The pipe of claim 1 wherein a plurality of openings are formed through the tube to receive the gases.

3. The pipe of claim 1 wherein the tube is fabricated from a porous material to receive the gases.

4. The flexible pipe of claim 1 wherein the axis of the tube extends parallel to the axis of the inner layer.

5. The flexible pipe of claim 1 wherein a plurality of tubes is angularly spaced around the axis of the inner layer.

6. The flexible pipe of claim 1 wherein the outer layer comprises a metal strip layer helically wound over the inner layer.

7. The flexible pipe of claim 6 further comprising a seal layer extending over the metal strip layer.

8. The flexible pipe of claim 7 further comprising at least one wire wrapped around the exterior of the seal layer to form a tensile layer.

9. The flexible pipe of claim 8 further comprising at least one wire wrapped around the tensile layer to form an additional tensile layer.

10. The flexible pipe of claim 1 wherein the outer layer comprises at least one wire wrapped around the exterior of the inner layer to form a tensile layer.

11. The flexible pipe of claim 10 wherein the outer layer further comprises at least one wire wrapped around the tensile layer to form an additional tensile layer.

12. The flexible pipe of claim 1, 6, 7, 8, 9, 10, or 11 further comprising a layer of wound tape extending between adjacent layers.

13. A method of manufacturing a flexible pipe, comprising forming at least one tube that allows for fluid to pass through its wall, embedding the tube along the length of tubular layer defining an inner longitudinal passage so that any gases received by the layer and permeating through or into the layer pass into the tube for discharge through an end of the tube, and disposing an outer layer over the inner layer.

14. The method of claim 13 further comprising forming a plurality of openings through the tube to receive the gases.

15. The method of claim 13 further comprising fabricating the tube from a porous material to receive the gases.

16. The method of claim 13 wherein a plurality of tubes are provided, with the axis of each tube extending parallel to the axis of the inner layer.

17. The method of claim 16 wherein the tubes are angularly spaced around the axis of the inner layer.

18. The method of claim 13 wherein the step of disposing comprises wrapping a metal strip layer over the inner layer.

19. The method of claim 18 further comprising disposing a seal layer over the metal strip layer.

20. The method of claim 19 further comprising wrapping at least one wire around the exterior of the seal layer to form a tensile layer.

21. The method of claim 20 further comprising wrapping at least one wire around the tensile layer to form an additional tensile layer.

22. The method of claim 13 wherein the step of disposing comprises wrapping at least one wire around the exterior of the inner layer to form a tensile layer.

23. The method of claim 22 wherein the step of disposing further comprises wrapping at least one wire around the tensile layer to form an additional tensile layer.

24. The method of claim 13 and 18, 19, 20, 21, 22, or 23 further comprising wrapping a tape between adjacent layers.

* * * * *